United States Patent
Beesley

(10) Patent No.: US 9,957,114 B2
(45) Date of Patent: May 1, 2018

(54) MULTI-CONVEYOR SPEED ADJUSTER

(71) Applicant: ILLINOIS TOOL WORKS INC., Glenview, IL (US)

(72) Inventor: Robert C. Beesley, Greenville, SC (US)

(73) Assignee: Illinois Tool Works Inc., Glenview, IL (US)

( * ) Notice: Subject to any disclaimer, the term of this patent is extended or adjusted under 35 U.S.C. 154(b) by 0 days. days.

(21) Appl. No.: 15/065,018

(22) Filed: Mar. 9, 2016

(65) Prior Publication Data

US 2016/0297618 A1    Oct. 13, 2016

Related U.S. Application Data

(60) Provisional application No. 62/146,453, filed on Apr. 13, 2015.

(51) Int. Cl.
| | | |
|---|---|---|
| *B65G 47/31* | (2006.01) | |
| *B65G 43/10* | (2006.01) | |
| *B65G 47/42* | (2006.01) | |
| *B65G 43/08* | (2006.01) | |
| *B65G 47/52* | (2006.01) | |

(52) U.S. Cl.
CPC ............ *B65G 47/31* (2013.01); *B65G 43/08* (2013.01); *B65G 43/10* (2013.01); *B65G 47/42* (2013.01); *B65G 47/52* (2013.01)

(58) Field of Classification Search
CPC ......... B65G 47/31; B65G 43/10; B65G 47/10
See application file for complete search history.

(56) References Cited

U.S. PATENT DOCUMENTS

| | | | | |
|---|---|---|---|---|
| 4,549,647 A | * | 10/1985 | Cosse ............... | B65G 47/5131 198/461.1 |
| 4,684,008 A | * | 8/1987 | Hayashi ............ | B65G 47/71 198/431 |
| 5,070,995 A | * | 12/1991 | Schaffer .......... | B65G 43/10 198/460.1 |
| 5,267,638 A | * | 12/1993 | Doane .............. | B65G 43/08 198/357 |
| 5,738,202 A | * | 4/1998 | Ydoate ............. | B65G 47/31 198/459.8 |

(Continued)

FOREIGN PATENT DOCUMENTS

| | | |
|---|---|---|
| EP | 0422635 | 4/1991 |
| WO | WO 2008/042294 | 4/2008 |

OTHER PUBLICATIONS

European Search Report for Application No. 16164129, dated Aug. 11, 2016.

*Primary Examiner* — Thomas Randazzo
(74) *Attorney, Agent, or Firm* — JK Intellectual Property Law, PA

(57) ABSTRACT

A device and a method for transferring articles between an infeed conveyor at a first speed and an outfeed conveyor at a second speed different than the first speed include use of at least a first variable speed conveyor downstream of the infeed conveyor, and a second variable speed conveyor downstream of the first variable speed conveyor and upstream of the outfeed conveyor. The speeds of the variable speed conveyors are cycled between the first speed and the second speed without any article being conveyed by conveyors at different speeds. At least one additional variable speed conveyor may be included.

18 Claims, 3 Drawing Sheets

(56) References Cited

U.S. PATENT DOCUMENTS

| | | | | |
|---|---|---|---|---|
| 5,823,319 A * | 10/1998 | Resnick | B65G 47/261 198/781.04 |
| 6,471,039 B1 * | 10/2002 | Bruun | B65G 37/02 198/577 |
| 6,575,287 B2 * | 6/2003 | Garvey | B65G 47/684 198/418.6 |
| 6,629,593 B2 * | 10/2003 | Zeitler | B65G 43/08 198/460.1 |
| 6,897,625 B2 * | 5/2005 | Brixius | B65G 43/10 198/571 |
| 7,168,552 B2 * | 1/2007 | Katayama | B65G 43/10 198/418.7 |
| 7,681,712 B2 * | 3/2010 | Hara | B65G 43/08 198/461.1 |
| 8,448,777 B2 * | 5/2013 | Pazdernik | B65G 47/088 198/418.6 |
| 8,612,050 B2 * | 12/2013 | Lee | B65B 35/44 198/411 |
| 2008/0082206 A1 * | 4/2008 | Egami | B65G 43/10 700/230 |
| 2016/0185534 A1 * | 6/2016 | Earling | B65G 47/684 198/347.1 |

* cited by examiner

MULTI-CONVEYOR SPEED ADJUSTER

CROSS-REFERENCE TO RELATED APPLICATIONS

This application is a U.S. Non-Provisional Patent Application, claiming benefit to U.S. Provisional Patent Application Ser. No. 62/146,453, filed Apr. 13, 2015 which is incorporated by reference herein.

TECHNICAL FIELD

The present disclosure relates generally to multi-conveyor devices and methods for changing speeds between other upstream and downstream conveyors.

BACKGROUND

Some article handling systems include an article flow path having multiple conveyors that run at different speeds from one another. A conventional interface between such conveyors may be a direct transfer from one conveyor to another with minimal spacing in between or an indirect transfer across a non-moving element such as a "dead plate," or a set of idler rollers or the like.

In certain applications, maintaining the integrity of objects conveyed across such interface is of increased importance. In some such systems, groups of objects (i.e., a number of bottles or cans) are loosely encircled in a sheet of shrinkable plastic while traversing one conveyor, and are then passed to a second conveyor for shrinking of the sheet (for example in a heated shrink tunnel). The objects when loosely encircled by the sheet may ride on a blank or tray, or they made simply be grouped and ride directly on the conveyor. In other systems, a single object is individually wrapped (i.e., a box). Some systems alternate between single objects and groups of objects. Regardless of whether a single object or grouping of objects is being wrapped, such items may all be called an "article" herein.

In all such systems above, a portion of the sheet is typically located beneath the article be wrapped (between the article and the conveyor on which it rides). Often leading and trailing edges of the sheet overlap beneath the article and are held in place via gravity of the article on the conveyor.

The sheets are placed about the article in a predetermined fashion so that upon heating in the shrink tunnel a desired package is achieved by the shrunken film. If the positioning (including any of such overlap that might be present) is disrupted during direct transfer between conveyors of differing speeds and/or indirect transfer across a dead plate, the package formed may be not as desired.

Accordingly, improved devices and methods of transferring articles from conveyor to conveyor, particularly conveyors that may be run at differing speeds, whether addressing one or more of the above issues and/or other issues, would be welcome.

SUMMARY

Aspects and advantages of the invention will be set forth in part in the following description, or may be obvious from the description, or may be learned through practice of the invention.

According to certain aspects of the invention, a device is disclosed for transferring articles between an infeed conveyor at a first speed and an outfeed conveyor at a second speed different than the first speed. The device may include, for example, a first variable speed conveyor downstream of the infeed conveyor, and a second variable speed conveyor downstream of the first variable speed conveyor and upstream of the outfeed conveyor. A first motor may drive the first variable speed conveyor selectively between the first speed and the second speed, and a second motor may drive the second variable speed conveyor selectively between the first speed and the second speed. A controller may control the speeds of the first and second motors as articles move sequentially along the infeed conveyor, the first variable speed conveyor, the second variable speed conveyor and the outfeed conveyor. The controller operates so as to sequentially move a given article from the infeed conveyor to the first variable speed conveyor, the second variable speed conveyer and the outfeed conveyor while cycling the speed of the first and second variable speed conveyors between the first speed and the second speed without the given article being conveyed by conveyors at different speeds. Various options and modifications are possible.

According to other aspects of the invention, a device is disclosed for transferring articles between an infeed conveyor at a first speed and an outfeed conveyor at a second speed different than the first speed. The device may include a first variable speed conveyor downstream of the infeed conveyor and a second variable speed conveyor downstream of the first variable speed conveyor and upstream of the outfeed conveyor. A first motor may drive the first variable speed conveyor selectively between the first speed and the second speed, and a second motor may drive the second variable speed conveyor selectively between the first speed and the second speed. A controller may control the speeds of the first and second motors as articles move sequentially along the infeed conveyor, the first variable speed conveyor, the second variable speed conveyor and the outfeed conveyor so as to sequentially move a given article from the infeed conveyor to the first variable speed conveyor. The controller may cause the first variable speed conveyor to move at the first speed until the given article moves off the infeed conveyor. The controller may also cause the first and second variable speed conveyors to move between the first speed and the second speed in unison while the given article is on both first and second variable speed conveyors. The controller may also cause the second variable speed conveyor to move at the second speed until the given article moves off the second variable speed conveyor. Again, various options and modifications are possible.

According to still other aspects of the invention, a device is disclosed for transferring articles between an infeed conveyor at a first speed and an outfeed conveyor at a second speed different than the first speed. The device may include at least two variable speed conveyors oriented sequentially between the infeed conveyor and the outfeed conveyor. Each variable speed conveyor may respectively have a motor for driving the at least two variable speed conveyors selectively between the first speed and the second speed so as to sequentially move a given article from the infeed conveyor along the at least two variable speed conveyors to the outfeed conveyor while cycling the speed of the at least two variable speed conveyors between the first speed and the second speed without the given article being conveyed by conveyors at different speeds. Again, various options and modifications are possible.

For example, with the device above, at least one additional variable speed conveyor may be located between the second variable speed conveyor and the outfeed conveyor. If so, the controller may also control the speed of the at least one additional variable speed conveyor so as to sequentially move a given article from the infeed conveyor to the first variable speed conveyor, the second variable speed conveyer, the at least one additional variable speed conveyor, and the outfeed conveyor while cycling the speed of the first, second and at least one additional variable speed conveyors between the first speed and the second speed without the given article being conveyed by conveyors at different speeds.

The first speed may be higher or lower than the second speed. The articles may have a length and a spacing between adjacent articles in the direction of movement on the infeed conveyor, and the length in the direction of movement of either of the first and second variable speed conveyors may be not greater than the spacing between the articles being conveyed in the direction of movement. Also, the first and second variable speed conveyors may collectively have a length in the direction of movement that is larger than a length of the given article in the direction of movement.

The first and second variable speed conveyors may each follow a respective cycle between the first speed and the second speed. If so, the first and second variable speed conveyors may be driven at differing speeds for most of the respective cycles. Also, the first and second variable speed conveyors may be driven at the same speed substantially only while an article is located on both of the first and second variable speed conveyors.

According to yet another aspect of the disclosure, a method of transferring articles between an infeed conveyor at a first speed and an outfeed conveyor at a second speed may include the steps of providing a flow of articles along the infeed conveyor; and sequentially moving the articles to a first variable speed conveyor, a second variable speed conveyer and the outfeed conveyor while cycling the speed of the first and second variable speed conveyors between the first speed and the second speed without any article being conveyed by conveyors at different speeds. Various options and modifications are possible.

According to other aspects of the disclosure, a method is disclosed of transferring articles between an infeed conveyor at a first speed and an outfeed conveyor at a second speed comprising the steps of providing a flow of articles along the infeed conveyor; sequentially moving the articles to at least two variable speed conveyors oriented sequentially between the infeed conveyor and the outfeed conveyor; and driving the at least two variable speed conveyors selectively between the first speed and the second speed so as to sequentially move a given article from the infeed conveyor along the at least two variable speed conveyors to the outfeed conveyor while cycling the speed of the at least two variable speed conveyors between the first speed and the second speed without the given article being conveyed by conveyors at different speeds. Again, various options and modifications are possible.

For example, the method could also further include sequentially moving the articles to at least one additional variable speed conveyor located between the second variable speed conveyor and the outfeed conveyor without any article being conveyed by conveyors at different speeds. If so, the sequentially moving step may include the controller causing the first variable speed conveyor to move at the first speed until the given article moves off the infeed conveyor, the controller causing the first and second variable speed conveyors to move between the first speed and the second speed in unison while the given article is on both first and second variable speed conveyors, and the controller causing the second variable speed conveyor to move at the second speed until the given article moves off the second variable speed conveyor.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
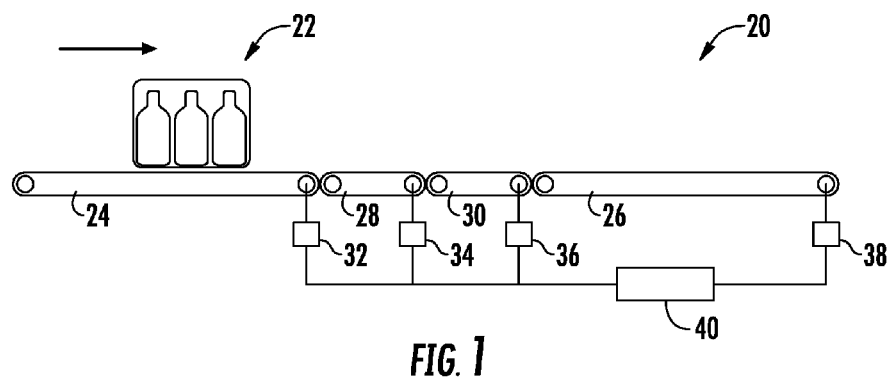
FIG. 1 is a diagrammatical side view of a first embodiment of a device and method of adjusting speeds of articles according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, FIGS. 1-12 show devices and methods for transferring articles between an infeed conveyor at a first speed and an outfeed conveyor at a second speed different than the first speed that include use of at least a first variable speed conveyor downstream of the infeed conveyor, and a second variable speed conveyor downstream of the first variable speed conveyor and upstream of the outfeed conveyor. The speeds of the variable speed conveyors are cycled between the first speed and the second speed without any article being conveyed by conveyors at different speeds. At least one additional variable speed conveyor may be included. The conveyors may be any type of endless loop conveyor suitable for transferring objects. Thus, link conveyors, belt conveyors, or even roller or driven wheel type conveyors in some applications may be employed. For an application such as feeding wrapped items to a shrink tunnel, however, endless loop conveyors such as belts may be desired.

More particularly, FIG. 1 shows a device 20 for performing a method of transferring articles 22 from an infeed conveyor 24 to an outfeed conveyor 26. A first variable speed conveyor 28 and a second variable speed conveyor 30 are located sequentially downstream of infeed conveyor 24 and upstream of outfeed conveyor 26.

Motors 32,34,36,38 are provided to drive conveyors 24,26,28,30, as controlled by a conventional programmable logic controller 40. If infeed and outfeed conveyors 24,26 are running at the same speed, then variable speed conveyors 28,30 can be run at the identical speed as directed by the controller and any sensors provided to sense package flow or other line conditions. (The speed discussed herein is generally the line speed measured conventionally of the top surface of each conveyor).

However, if the condition is that infeed conveyor 24 is running at one speed and outfeed conveyor 26 is running at another speed, then the speeds of variable speed conveyors 28 and 30 can be varied accordingly to transfer articles 22 from the infeed conveyor to the outfeed conveyor with minimal disruption. This can be especially useful in a line where articles such as a grouping of items or a box or the like are encircled with a sheet of shrinkable film for transmission to a shrink tunnel.

Figure 2:
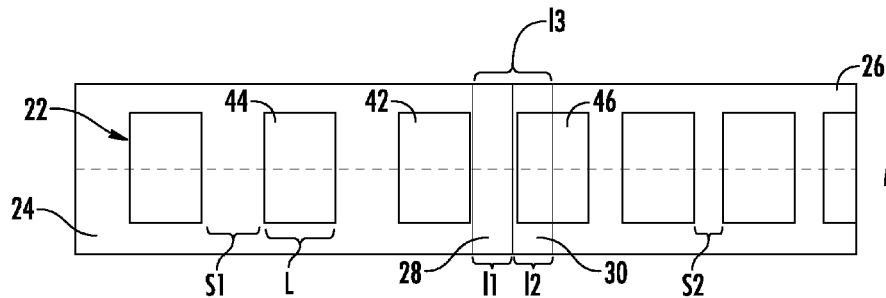
FIG. 2 is a diagrammatical top view of the device and method of FIG. 1 in a first condition during a cycle in which the upstream infeed conveyor is faster than the downstream outfeed conveyor.

At steady state, typically infeed conveyor 24 provides articles 22 having a given uniform length L in the direction of movement and a given uniform spacing S1 between adjacent articles in the direction of movement (See FIG. 2). If outfeed conveyor 26 is at a different speed, then the speed and spacing S2 of articles on that conveyor would also be altered from that of infeed conveyor 24 by use of variable speed conveyors 28,30.

Figure 6:
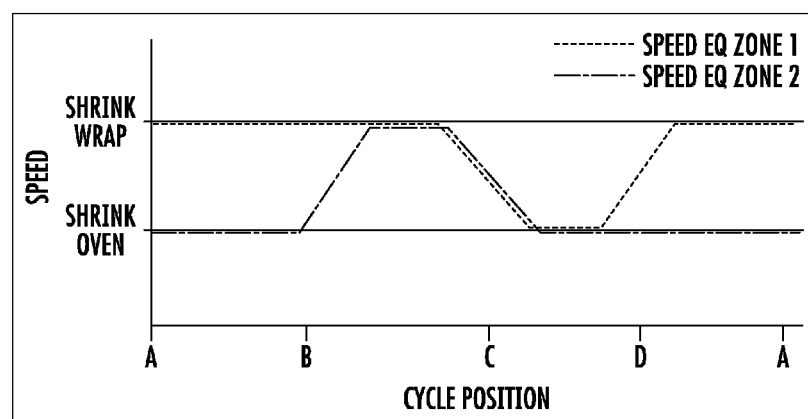
FIG. 6 is a diagrammatic view of the speeds of the first and second variable speed conveyors of the device and method of FIG. 1 during the cycle of FIGS. 2-5.

For example, FIGS. 2-5 show four conditions of articles and conveyors 24-30, with FIG. 6 showing speeds of variable speed conveyors 28,30. In FIGS. 2-6, infeed conveyor 24 is faster than outfeed conveyor 26.

In particular, article 42 will be discussed in detail below as it traverses the conveyors and changes speeds and spacing to adjacent articles. In FIG. 2, article 42 is located on conveyor 24, and conveyor 28 is being driven at the same speed as conveyor 24. Upstream article 44 is on conveyor 24 and downstream article 46 is on conveyors 30 and 26. Downstream article 46 is being driven at the speed of conveyor 26, as will be discussed below.

Figure 3:
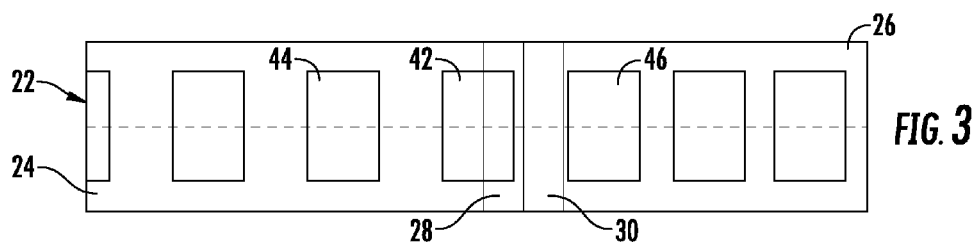
FIG. 3 is a diagrammatical top view of the device and method as in FIG. 2 in a second condition during a cycle.
Figure 4:
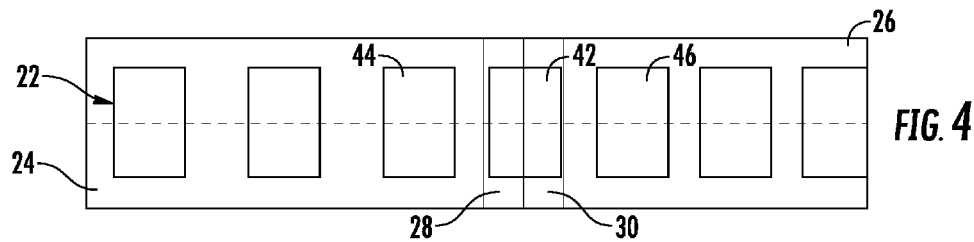
FIG. 4 is a diagrammatical top view of the device and method as in FIG. 2 in a third condition during a cycle.
Figure 5:
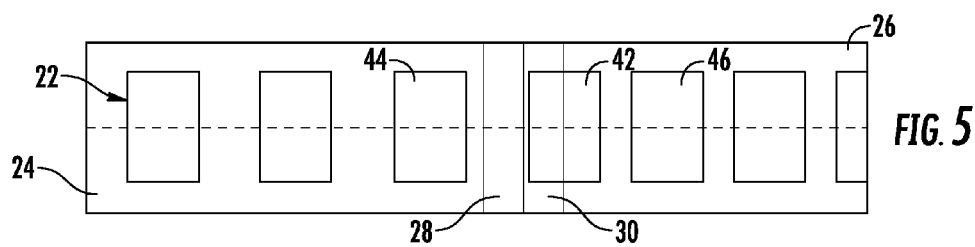
FIG. 5 is a diagrammatical top view of the device and method as in FIG. 2 in a fourth condition during a cycle.

Returning to article 42 in FIG. 2, first variable speed conveyor 28 is driven at the speed of infeed conveyor 24 as article 42 moves off infeed conveyor 24 (see FIGS. 3 and 4). When article 42 reaches second variable speed conveyor 30, that conveyor is driven at the same speed as first variable speed conveyor 28 and infeed conveyor 24 until article 42 is off infeed conveyor 24.

At this point (FIG. 4) article 42 is located on both (and only) first and second variable speed conveyors 28 and 30, and the speeds of those conveyors are dropped to match the speed of outfeed conveyor 26. Note the simultaneous and equal drop in speeds of both variable speed conveyors in FIG. 6 until the speeds match the speed of outfeed conveyor 26.

When article 42 moves off first variable speed conveyor 28 (FIG. 5), it is being carried by second variable speed conveyor 30 and outfeed conveyor 26. At this point, first variable speed conveyor 28 begins to change speed (speed up) again to reach the speed of infeed conveyor 24. The system returns to position of FIG. 2 again (with reference to upstream article 44 instead of article 42), with second variable speed conveyor 30 matching the speed of outfeed conveyor 26 until article 42 moves off the second outfeed conveyor. After article 42 moves off second variable speed conveyor 30, that conveyor changes speeds (speeds up) to match the speed of first variable speed conveyor 28 as article 44 approaches. The cycle shown in FIGS. 2-6 continues over and over for successive articles 22.

Thus, it can be said that articles 22 move sequentially along infeed 24 conveyor, first variable speed conveyor 28, second variable speed conveyor 30 and outfeed conveyor 26 so as to sequentially move a given article 42 from the infeed conveyor to the first variable speed conveyor, the second variable speed conveyer and the outfeed conveyor while cycling the speed of the first and second variable speed conveyors between the speed of conveyor 24 and the speed of conveyor 26 without the given article being conveyed by conveyors at different speeds. In other words, an article is not located on two conveyors at differing speeds. When speed changes occur, an article is on two conveyors that are changing speed simultaneously and equally (i.e., in unison).

As noted, articles 22 have a length L and a spacing S1 between them along the direction of movement while on infeed conveyor 24. If desired, the length 11,12 in the direction of movement of either of the first and second variable speed conveyors is not greater than the spacing S1. If the spacing S1 is relatively small compared to the length L1 of the articles, this ensures that the variable speed conveyors can be driven independently as needed to match upstream and downstream speeds and to change speeds as described above.

Generally, to save cost and space, one would expect to want smaller variable speed conveyors 28, 30. However, first and second variable speed conveyors 28, 30 may collectively have a length l3 in the direction of movement that is larger than the length L of the given article 22 in the direction of movement. This also helps ensure that the variable speed conveyors can be driven independently as needed to match upstream and downstream speeds and to change speeds as described above.

FIGS. 7-11 show an alternate arrangement where upstream conveyor 24 is slower than downstream conveyor 26. Essentially, the operation here is reversed from that of FIGS. 2-6.

Figure 7:
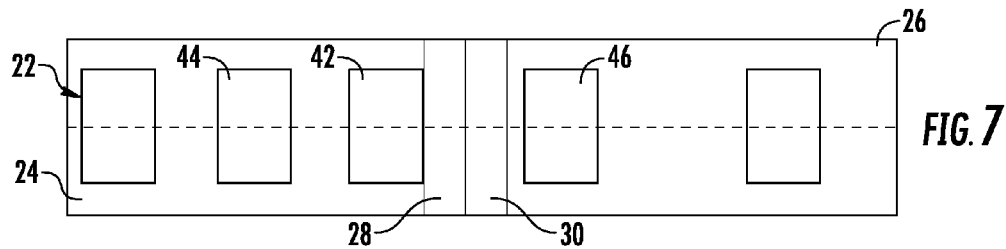
FIG. 7 is a diagrammatical top view of the device and method of FIG. 1 in a first condition during a cycle in which the upstream infeed conveyor is slower than the downstream outfeed conveyor.
Figure 8:
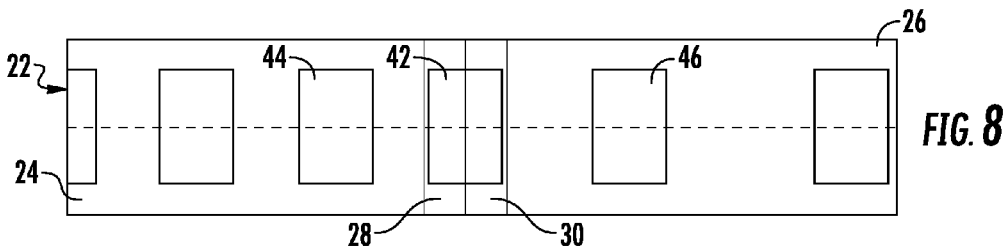
FIG. 8 is a diagrammatical top view of the device as in FIG. 7 in a second condition during a cycle.
Figure 9:
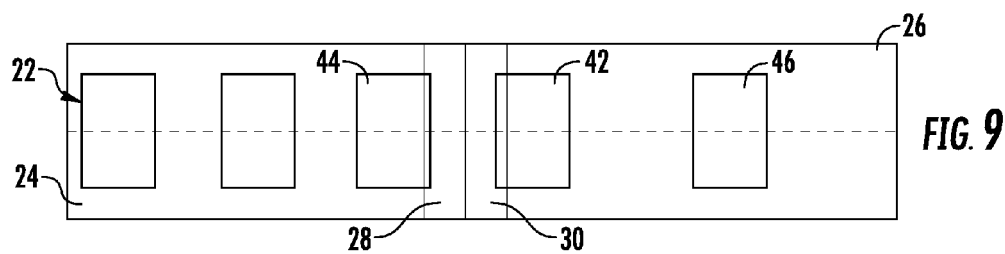
FIG. 9 is a diagrammatical top view of the device as in FIG. 7 in a third condition during a cycle.

In FIG. 7 article 42 is on infeed conveyor 24, and by FIG. 8 it has moved onto first and second variable speed conveyors 28,30. While in contact with article 42, the speeds of variable speed conveyors 28,30 are driven to match the speed of infeed conveyor 24.

Figure 10:
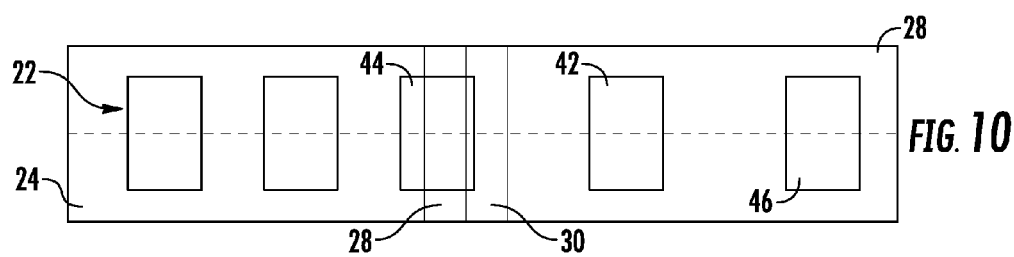
FIG. 10 is a diagrammatical top view of the device as in FIG. 7 in a fourth condition during a cycle.
Figure 11:
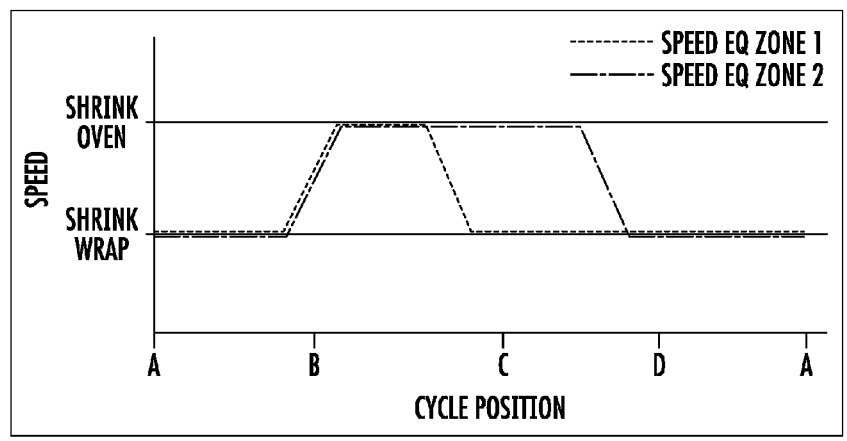
FIG. 11 is a diagrammatic view of the speeds of the first and second variable speed conveyors of the device and method of FIG. 1 during the cycle of FIGS. 7-10.

Once article 42 moves off infeed conveyor (FIG. 8), the speeds of conveyors 28,30 are raised to match the speed of outfeed conveyor 26. Once article 42 moves off first variable speed conveyor 28, the speed of that conveyor returns to the speed (slows) of infeed conveyor 24 to be ready to receive article 44. Second variable speed conveyor 30 stay at the speed of outfeed conveyor 26 until article 42 is completely on the outfeed conveyor (FIG. 10). At that point, second variable speed conveyor 30 returns to the speed of infeed conveyor 24 to receive article 44 and the cycle starts again (as in FIG. 7) for article 44.

It can therefore be said that the above provides a method of transferring articles between infeed conveyor 24 at a first speed and outfeed conveyor 26 at a second speed including providing a flow of articles 22 along the infeed conveyor, and sequentially moving the articles to first variable speed conveyor 28, second variable speed conveyer 30 and outfeed conveyor 26 while cycling the speed of the first and second variable speed conveyors between the first speed and the second speed without any article being conveyed by conveyors at different speeds.

Figure 12:
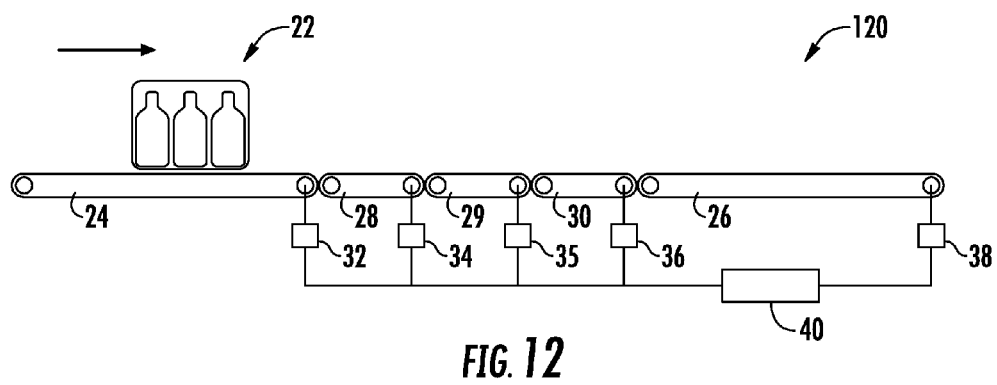
FIG. 12 is a diagrammatical side view of a second embodiment of the device and method of adjusting speeds of articles according to the present disclosure, including a third variable speed conveyor.

It would also be possible, for example where larger speed differences are present, where article size or spacing differences occur, etc., to employ more than two variable speed conveyors. FIG. 12 shows a system 120 having three such variable speed conveyors, 28,29,30 between infeed and outfeed conveyors 24,26, although four or more of such variable speed conveyors cold be employed.

In such embodiment, the variable speed conveyors could operate in pairs. For example, conveyors 28 and 29 could effect half of the speed change from the speed of infeed conveyor 24 to the speed of outfeed conveyor 26, and conveyors 29 and 30 could effect the second half of the speed change. Alternatively, all three conveyors 28,29,30 could cycle fully between the speed of infeed conveyor 24 and the speed of outfeed conveyor 26.

While preferred embodiments of the invention have been described above, it is to be understood that any and all equivalent realizations of the present invention are included within the scope and spirit thereof. Thus, the embodiments depicted are presented by way of example only and are not intended as limitations upon the present invention. Thus, while particular embodiments of the invention have been described and shown, it will be understood by those of ordinary skill in this art that the present invention is not limited thereto since many modifications can be made. Therefore, it is contemplated that any and all such embodiments are included in the present invention as may fall within the literal or equivalent scope of the appended claims.

I claim:

1. A device for transferring articles between an infeed conveyor at a first speed and an outfeed conveyor at a second speed different than the first speed, the device comprising:
   a first variable speed conveyor downstream of the infeed conveyor;
   a second variable speed conveyor downstream of the first variable speed conveyor and upstream of the outfeed conveyor;
   a first motor for driving the first variable speed conveyor selectively between the first speed and the second speed;
   a second motor for driving the second variable speed conveyor selectively between the first speed and the second speed;
   a controller for controlling the speeds of the first and second motors as articles move sequentially along the infeed conveyor, the first variable speed conveyor, the second variable speed conveyor and the outfeed conveyor so as to sequentially move a given article from the infeed conveyor to the first variable speed conveyor, the second variable speed conveyer and the outfeed conveyor while cycling the speed of the first and second variable speed conveyors between the first speed and the second speed so that while the given article is in contact with any adjacent two conveyors of the infeed conveyor, the first variable speed conveyor, the second variable speed conveyor, and the outfeed conveyor, the adjacent two conveyors are driven at the same speed, wherein the articles have a length and a substantially uniform spacing between adjacent articles in the direction of movement on the infeed conveyor, the length in the direction of movement of either of the first and second variable speed conveyors is not greater than the spacing between the articles being conveyed in the direction of movement.

2. The device of claim 1, wherein the controller causes the first variable speed conveyor to move at the first speed until the given article moves off the infeed conveyor, the controller causing the first and second variable speed conveyors to move between the first speed and the second speed in unison while the given article is on both first and second variable speed conveyors, the controller causing the second variable speed conveyor to move at the second speed until the given article moves off the second variable speed conveyor.

3. The device of claim 1, wherein the first and second variable speed conveyors collectively have a length in the direction of movement that is larger than a length of the given article in the direction of movement.

4. The device of claim 1, wherein at least one additional variable speed conveyor is located between the second variable speed conveyor and the outfeed conveyor.

5. The device of claim 4, wherein the controller also controls the speed of the at least one additional variable speed conveyor so as to sequentially move a given article from the infeed conveyor to the first variable speed conveyor, the second variable speed conveyer, the at least one additional variable speed conveyor, and the outfeed conveyor while cycling the speed of the first, second and at least one additional variable speed conveyors between the first speed and the second speed.

6. A device for transferring articles between an infeed conveyor at a first speed and an outfeed conveyor at a second speed different than the first speed, the device comprising:
   a first variable speed conveyor downstream of the infeed conveyor;
   a second variable speed conveyor downstream of the first variable speed conveyor and upstream of the outfeed conveyor;
   a first motor for driving the first variable speed conveyor selectively between the first speed and the second speed;
   a second motor for driving the second variable speed conveyor selectively between the first speed and the second speed;
   a controller for controlling the speeds of the first and second motors as articles move sequentially along the infeed conveyor, the first variable speed conveyor, the second variable speed conveyor and the outfeed conveyor so as to sequentially move a given article from the infeed conveyor to the first variable speed conveyor, the controller causing the first variable speed conveyor to move at the first speed until the given article moves off the infeed conveyor, the controller causing the first and second variable speed conveyors to move between the first speed and the second speed in unison while the given article is on both first and second variable speed conveyors, the controller causing the second variable speed conveyor to move at the second speed until the given article moves off the second variable speed conveyor, wherein the articles have a width and a substantially uniform spacing between adjacent articles in the direction of movement on the infeed conveyor, the length in the direction of movement of either of the first and second variable speed conveyors is not greater than the spacing between the articles being conveyed in the direction of movement.

7. The device of claim 6, wherein the first speed is higher than the second speed.

8. The device of claim 6, wherein the first speed is lower than the second speed.

9. The device of claim 6, wherein the first and second variable speed conveyors collectively have a length in the direction of movement that is larger than a length of the given article in the direction of movement.

10. The device of claim 6, wherein at least one additional variable speed conveyor is located between the second variable speed conveyor and the outfeed conveyor.

11. The device of claim 10, wherein the controller also controls the speed of the at least one additional variable speed conveyor so as to sequentially move a given article from the infeed conveyor to the first variable speed conveyor, the second variable speed conveyer, the at least one additional variable speed conveyor, and the outfeed conveyor while cycling the speed of the first, second and at least one additional variable speed conveyors between the first speed and the second speed.

12. The device of claim 6, wherein the first and second variable speed conveyors each follow a respective cycle between the first speed and the second speed.

13. The device of claim 12, wherein the first and second variable speed conveyors are not driven at the same speed for most of the respective cycles.

14. The device of claim 12, wherein the first and second variable speed conveyors are driven at the same speed substantially only while an article is located on both of the first and second variable speed conveyors.

15. A method of transferring articles between an infeed conveyor at a first speed and an outfeed conveyor at a second speed comprising the steps of:

providing a flow of articles along the infeed conveyor; and sequentially moving the articles to a first variable speed conveyor, a second variable speed conveyer and the outfeed conveyor while cycling the speed of the first and second variable speed conveyors between the first speed and the second speed so that while a given article is in contact with any adjacent two conveyors of the infeed conveyor, the first variable speed conveyor, the second variable speed conveyor, and the outfeed conveyor, the adjacent two conveyors are driven at the same speed, wherein the articles have a length and a substantially uniform spacing between adjacent articles in the direction of movement on the infeed conveyor, the length in the direction of movement of either of the first and second variable speed conveyors is not greater than the spacing between the articles being conveyed in the direction of movement.

16. The method of claim 15, further including sequentially moving the articles to at least one additional variable speed conveyor located between the second variable speed conveyor and the outfeed conveyor.

17. The method of claim 15, wherein the sequentially moving step includes the controller causing the first variable speed conveyor to move at the first speed until the given article moves off the infeed conveyor, the controller causing the first and second variable speed conveyors to move between the first speed and the second speed in unison while the given article is on both first and second variable speed conveyors, and the controller causing the second variable speed conveyor to move at the second speed until the given article moves off the second variable speed conveyor.

18. The method of claim 15, wherein the first and second variable speed conveyors collectively have a length in the direction of movement that is larger than a length of the given article in the direction of movement.

* * * * *